(12) United States Patent
Laitinen

(10) Patent No.: US 7,970,380 B2
(45) Date of Patent: Jun. 28, 2011

(54) USER AUTHENTICATION IN A COMMUNICATIONS SYSTEM

(75) Inventor: Lauri Laitinen, Espoo (FI)

(73) Assignee: Nokia Corporation, Espoo (FI)

( * ) Notice: Subject to any disclaimer, the term of this patent is extended or adjusted under 35 U.S.C. 154(b) by 357 days.

(21) Appl. No.: 11/146,154

(22) Filed: Jun. 7, 2005

(65) Prior Publication Data

US 2006/0205387 A1 Sep. 14, 2006

(30) Foreign Application Priority Data

Mar. 9, 2005 (GB) .................................. 0504865.7

(51) Int. Cl.
*H04B 1/04* (2006.01)
(52) U.S. Cl. ..................... 455/411; 455/433; 455/435.1; 455/410; 380/229; 380/232; 380/247; 380/248; 380/249
(58) Field of Classification Search .................. 455/411, 455/433; 713/155; 380/229, 232, 247–250, 380/258
See application file for complete search history.

(56) References Cited

U.S. PATENT DOCUMENTS

| 5,297,189 | A | * | 3/1994 | Chabernaud | 455/461 |
| 6,091,946 | A | * | 7/2000 | Ahvenainen | 455/411 |
| 7,139,377 | B2 | * | 11/2006 | Pinault | 379/201.01 |
| 2003/0065747 | A1 | * | 4/2003 | Sakamoto et al. | 709/219 |
| 2004/0153667 | A1 | * | 8/2004 | Kastelewicz et al. | 713/201 |
| 2004/0167966 | A1 | * | 8/2004 | Lee et al. | 709/206 |
| 2006/0205388 | A1 | * | 9/2006 | Semple et al. | 455/411 |
| 2006/0253424 | A1 | * | 11/2006 | Huang | 707/2 |

FOREIGN PATENT DOCUMENTS

WO WO 2004/032557 A1 4/2004

OTHER PUBLICATIONS

3GPP TS 33.220 V1.0.0. 3rd Generation Partnership Project; Technical Specification Group Services and System Aspect; Generic Authentication Architecture (GAA); Generic Bootstrapping Architecture (Release 6) (Dec. 2003).*
ETSI TS 133 220 V6.3.0 (Dec. 2004), "*Universal Mobile Telecommunications System (UMTS); Generic Authentication Architecture (GAA); Generic Bootstrapping Architecture (3GPP TS 33.220 Version 6.3.0 Release 6)*" pp. 1-38.
ETSI TSA 133 222 V6.2.0 (Dec. 2004), "*Universal Mobile Telecommunications System (UMTS); Generic Authentication Architecture (GAA); Access to Network Application Functions Using Hypertext Transfer Protocol Over Transport Layer Security (HTTPS) (3GPP TS 33.222 Version 6.2.0 Release 6)*" pp. 1-19.
Translation of the First Office Action dated Feb. 12, 2010, issued by the State Intellectual Property Office, in connection with counterpart Chinese application No. 200680007421.0.

* cited by examiner

*Primary Examiner* — Wayne Cai
(74) *Attorney, Agent, or Firm* — Mintz, Levin, Cohn, Ferris, Glovsky, and Popeo, P.C.

(57) ABSTRACT

A method in a communication network wherein users are authenticated based on network originated user identities is disclosed. The authentication method comprising the steps of receiving a network originated identity from a user and associating the network originated identity with at least one non-network originated identity stored in a data storage. When a non-network originated identity is received from the user, the non-network originated identity from the user is compared with the at least one non-network originated identity from the data storage. The user is authenticated if the comparison is valid.

22 Claims, 13 Drawing Sheets

USER AUTHENTICATION IN A COMMUNICATIONS SYSTEM

BACKGROUND OF THE INVENTION

1. Field of the Invention

The present disclosure relates to authentication of a user in a communications system.

2. Description of the Related Art

A communication system can be seen as a facility that enables communication sessions between two or more entities such as user equipment and/or other nodes associated with the communication system. The communication may comprise, for example, communication of voice, data, multimedia and so on. A user equipment connected to a communication system may, for example, be provided with a two-way telephone call or multi-way conference call or with a data connection. In addition voice call services, various other services, for example multimedia services or other data services, may be provided for a user. A user equipment may communicate packet data to and from a server entity, or between two or more user equipments.

A communication system typically operates in accordance with a given standard or specification which sets out what the various entities associated with the system are permitted to do and how that should be achieved. Communication protocols and/or parameters which shall be used for the connection are also typically defined. In other words, a specific set of "rules" on which the communication can be based on needs to be defined to enable a user to communicate via the communication system.

Communication systems proving wireless communication for user equipment are known. These systems are commonly referred to as mobile systems, although in certain systems the mobility may be restricted to substantially small areas. An example of the mobile systems is the public land mobile network (PLMN). Another example is a mobile system that is based, at least partially, on use of communication satellites. Mobile communications may also be provided by means of other types of systems, such as by means of wireless local area networks (WLAN).

In a PLMN system a base station provides user equipment with access to the communication system. A user equipment may be in wireless communication with two or more base stations at the same time. Communication on the wireless interface between the user equipment and the base station(s) can be based on an appropriate communication protocol. Examples of the various wireless access systems include the CDMA (Code Division Multiple Access), WCDMA (Wideband CDMA), TDMA (Time Division Multiple Access), FDMA (Frequency Division Multiple Access), or SDMA (Space Division Multiple Access) and hybrids thereof.

The operation of the network apparatus is controlled by an appropriate control arrangement commonly including a number of various control entities with different functions. One or more gateway nodes may also be provided for connecting a network to other networks. For example, a cellular network may be connected to other cellular or fixed line communication networks or communication networks such as an IP (Internet Protocol) and/or other packet data networks.

A user or the user equipment commonly needs to be authenticated before he/she is allowed to access or otherwise use various applications and services. This may be required for security and privacy reasons. The networks may need to be sure that the user is whoever he/she claims to be, that the user has the right to use a certain service, that the user can be provided with an access to sensitive information and so on.

A user can be identified based on various identifiers. These can be divided into public and private or secret identifiers. The secret identifiers are typically only known by the operator whereas the public identifiers may be made public. Examples of secret user identities include International Mobile Subscriber Identity (IMSI) and Internet Protocol Multimedia Private Identity (IMPI). Examples of public identities include Mobile Subscriber Integrated System Digital Number (MSISDN) and IP Multimedia Public Identity (IMPU).

Various authentication mechanisms are already in place, or have been proposed. An example is an authentication mechanism is the 'Generic Authentication Architecture' (GAA) as proposed by the third generation partnership project (3GPP). The GAA is indented to be used as a security procedure for various applications and services for users of mobile user equipment, such as mobile stations for cellular systems. The GAA is based on secret user identities that are stored on specific secure storage entities provided in association with the user equipment and subscriber databases. The secure storage entity of a user equipment may be provided by an appropriate security module or identification module. The subscriber database may be provided by a network entity such as a Home Location Register or Home Subscriber Server (HLR/HSS). The secure user identity storage entities and the subscriber database entities are typically directly controlled by the operators who issue the user identities and who typically run and own the subscriber databases. It is a commonly held view that use of the secret identities together with operator controlled databases provides a solid platform user authentication.

However, because proposals for the authentication systems, such as the GAA, are based on subscriber databases they are restricted by the necessity to use user identities originating from the operators. These identities are called in the following by terms such as home operator identities or network originated identities. Potential applications, however, may use their own user identities that are not known by the operators, or whose authenticity cannot be confirmed by the operators, and therefore the current authentication mechanisms may not be applicable. These identities are generally called in the following as the non-network originated identities. It is not possible at the moment to allow user identities to be authenticated which are not in the class of existing mobile user identities, i.e. the non-network originated identities. Such user identities are typically used by users of user equipment to access specific applications which for one reason or another do not use the network originated identity. It might nevertheless be advantageous if an existing operator based authentication mechanism could be used also for identities which originate outside the operator's domain.

It is noted that the problem is not limited to mobile systems, but may occur in any communication environment wherein the user may access services and applications by different types of user equipment and/or via different access systems.

SUMMARY OF THE INVENTION

Embodiments of the present invention aim to address one or several of the above problems.

According to one embodiment, there is provided a method in a communication network wherein users are authenticated based on network originated user identities. The authentication method comprising the steps of receiving a network originated identity from a user and associating the network originated identity with at least one non-network originated identity stored in a data storage. When a non-network originated identity is received from the user, the non-network originated identity from the user is compared with the at least one non-network originated identity from the data storage. The user is authenticated if the comparison is valid.

According to another embodiment, there is provided an authentication apparatus for authenticating a user in a communications system, wherein the user provides a network originated identity and a non-network originated identity. The apparatus comprises means for receiving a network originated identity from a user, means for associating the network originated identity with at least one non-network originated identity, means for receiving a non-network originated identity from the user, means for comparing the non-network originated identity from the user with the at least one non-network originated identity from the means for associating, and means for authenticating the user if the comparison is valid.

In a more specific embodiment, the association of the identities is provided by an application server.

The authentication may be provided by the data storage, a bootstrapping function, or an application server.

Intermediate identities may be employed. Data for association between intermediate identities and non-network originated identities may be held at an application server. A temporary identifier may be created by a bootstrapping function, and the temporary identifier may be sent from a user equipment to an application function.

The embodiments of the invention may provide advantage in that an existing authentication mechanism that is based on operator originated identities may be used for authentication based on different identities. An operator may not need to store identities which are not assigned and/or controlled by the operator. Thus, the embodiments may allow the capabilities of an existing authentication system, for example for mobile identities, to be easily expanded to applications that use non-cellular i.e. non-mobile user identities.

In the following described embodiments this is achieved by storing associations between non-mobile identities with IMPI or IMPU somewhere in GM or outside GAA.

BRIEF DESCRIPTION OF DRAWINGS

For better understanding of the present invention, reference will now be made by way of example to the accompanying drawings in which.

DETAILED DESCRIPTION OF THE PREFERRED EMBODIMENTS

Some exemplifying and non-limiting embodiments of the invention are discussed below with reference to a mobile communication network such as a public landline mobile network (PLMN). Before explaining these in more detail, a communication system comprising at least a PLMN is briefly explained with reference to FIG. 1.

Figure 1:
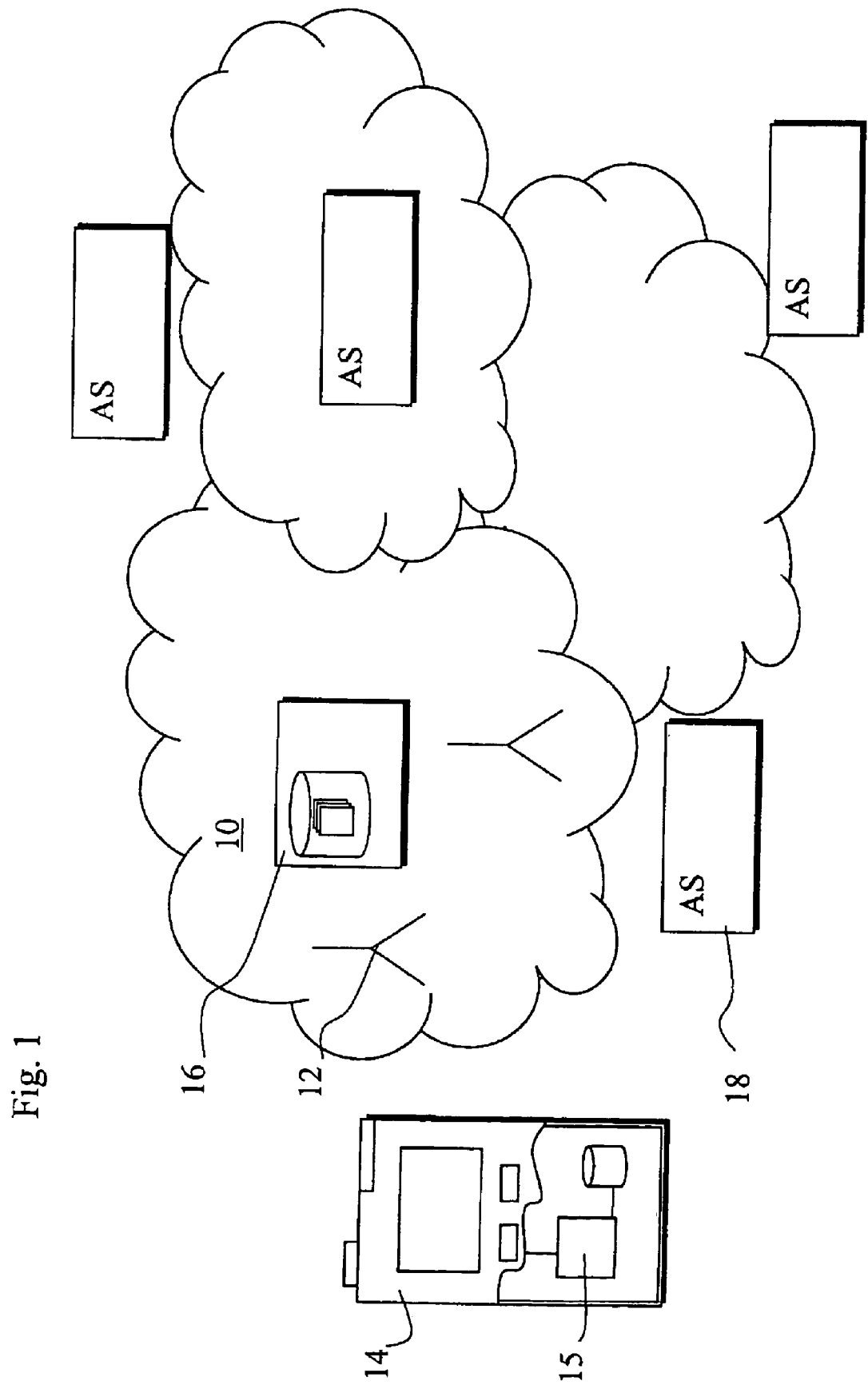
FIG. 1 shows a communication system wherein the present invention may be embodied.

In a PLMN 10 a number of base stations 12 is arranged to wirelessly transmit signals to and receive signals from a plurality of mobile user equipment. Likewise, a mobile user equipment 14 is able to transmit wireless signals to and receive signals from appropriate base station. The operation of the network 10 is typically controlled by means of appropriate controller entities. Data required for operation is typically stored in appropriate data storage entities. For clarity, FIG. 1 shows only a data storage entity 16 configured to store subscriber data. Non-limiting examples of subscriber data storages include various home location registers (HLR) and home subscriber servers (HSS).

An appropriate mobile user equipment is provided with required radio transmission elements and controller functions so that it is enabled to send and receive data from the network, and process control instructions it may receive from the network and to send required control information to the network. A user equipment (UE) 14 can take the form of any form of user terminal. In a mobile communications system, the user equipment constitutes a mobile terminal, for example a mobile telephone, personal digital assistant (PDA) or mobile PC (personal computer), or the like. For use in a wireless communications system, the user equipment comprises receive and transmit circuitry and means for receiving and transmitting wireless signals for implementing calls and other signaling channels.

A mobile user equipment is typically provided with an identity module 15. The identity module of a user equipment is commonly understood to refer to a storage of a secure identifier that is arranged to enable the networks to ensure that the user and the user equipment are who they claim to be. A user identity module may contain a number of security and other applications. Well known non-limiting examples of user identity modules are the Subscriber Identity Module (SIM) of the 2G GSM and User Identity Circuit Card (UICC) of the 3G systems. User identity modules and the HSS may store user identities such as the IMSI (International Mobile Subscriber Identity) and the IMPI (International Mobile Private Identity) and also other shared secrets. A user may have several kinds of user identities that are stored in a user identity module and the HSS. For example, an IMPI may be used inside a security domain whereas a set of IMPUs (IM PUblic Identities) may be used outside the security domain. A user identity module may hold shared secrets with a HSS and generate security keys from the shared secret. These keys may then be used in creation of trusted connections between the user equipment and a network application function (NAF) in operations such as bootstrapping.

A user may access various applications, for example service applications via the network he or she subscribes to. The application may be provides by a provider entity, for example any of service provider servers 18. It is noted that the application servers need only be connected to the network, but are not necessarily a part of it. This means that the operator of the network 10 may not necessarily have any or has only a limited control on the operation of an application provider. Furthermore, a communication system may be provided by a plurality of different communication networks. Thus the application provider entity may be connected to another network than the network the user subscribes to.

Figure 2:
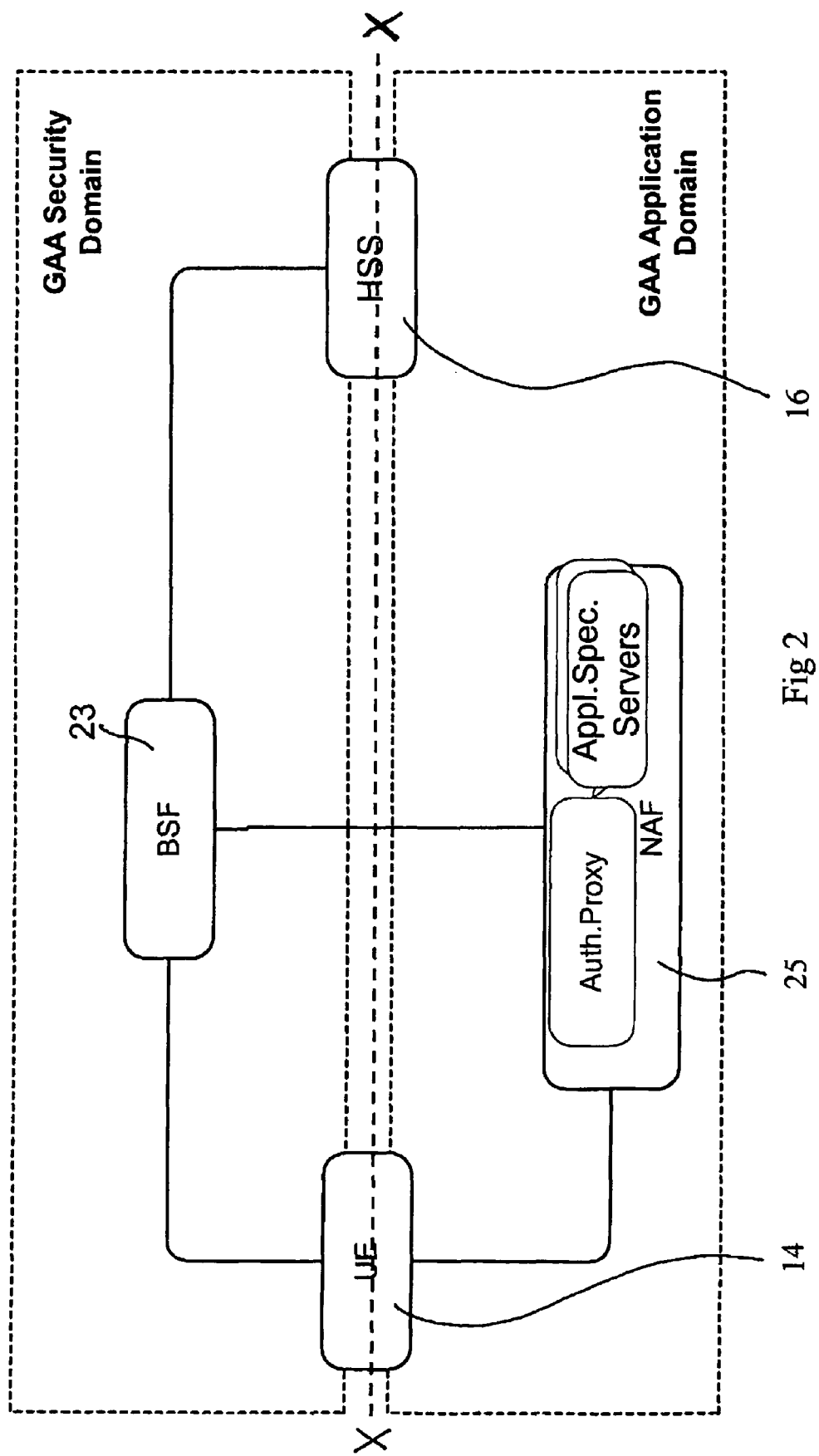
FIG. 2 shows the architecture of an existing authentication mechanism.

FIG. 2 shows an example of a proposed authentication mechanism 20. More particularly, FIG. 2 is a schematic block diagram of an existing infrastructure utilized as a generic authentication architecture (GAA) in the standardization for 3GPP systems. This architecture can be used in embodiments of the present invention in a number of different ways as discussed in more detail below. Various components will be described herein only briefly as these are already known to a person skilled in the art.

The GAA is based on secret user identities that are stored on appropriate user identity modules 15 on the user equipment 14 and subscriber databases 16 on the network side. Both of these entities are directly under control of the operator who issues the user identities and who commonly runs and owns the subscriber database(s).

The mechanism can be generally divided between GAA security domain 22 and GAA application security domain 24. The security domain is understood to comprise a bootstrapping function (BSF) 23 which will be described in more detail below. The application domain 24 is understood to comprise functions such as a GAA network application function 25. Application specific servers are also located in the GAA application security domain 24.

The user equipment 14 may communicate with an authentication proxy (AP) 25, in this case in the form of a network applications function (NAF) over an appropriate interface, for example a $U_a$ interface. The network applications function 25 is accessible by the user equipment 14 but before it can deliver its services to the user equipment 14 an authentication procedure needs to be implemented. The user equipment 14 can also communicate over an appropriate interface, for example a Ub interface, with a bootstrapping function (BSF) 23 which lies in a GAA security domain 22. The dashed line X-X denotes the separation between the GAA application domain 24 and the GAA security domain 22. The bootstrapping function 23 may communicate with a home subscriber server (HSS) 16 over an appropriate interface, for example a $Z_h$ interface. Optionally, the home subscriber server 16 may communicate with an application specific server (ASS) which lies in the GAA application domain 24.

When the user equipment 14 wishes to access a network application function 25, it undergoes an authentication procedure by dispatching a mobile user identity to the bootstrapping function 23 over the $U_b$ interface. The bootstrapping function 23 can be in communication with the network application function 25 over a $Z_n$ interface to allow it to communicate the results of the authentication to the network application function 25. Authentication using the identities originated from the mobile network can be implemented at the bootstrapping function 23 using shared key pairs in a manner which is known. Presently however the GAA architecture is not utilized for identities that do not originate from, i.e. are originally unknown by the mobile system.

The following embodiments of the present invention extend the application of GAA to allow non-cellular user identities to be checked. In order to do this, an association is provided between at least one non-cellular and the normal cellular mobile user identity. As discussed in connection with the different exemplifying embodiments below, this association can be made in a number of different locations. Moreover, there are various possible mechanisms for verifying the correctness of the identities.

According to a possibility, the GAA security domain verifies the non-cellular identity directly. According to another possibility, the GAA security domain verifies the IMPU and the GAA application domain verifies the non-cellular identity with the IMPU.

An existing authentication mechanism 20 of the mobile communications network 10 may be extended to cover applications wherein user identities received from the user equipment are not known by the network 10. This is provided by performing appropriate conversion or coherence checking between identities that originate from the mobile network 10 and identities that originate elsewhere. This can be provided by means of associations between these two types of identifiers.

Figure 3:
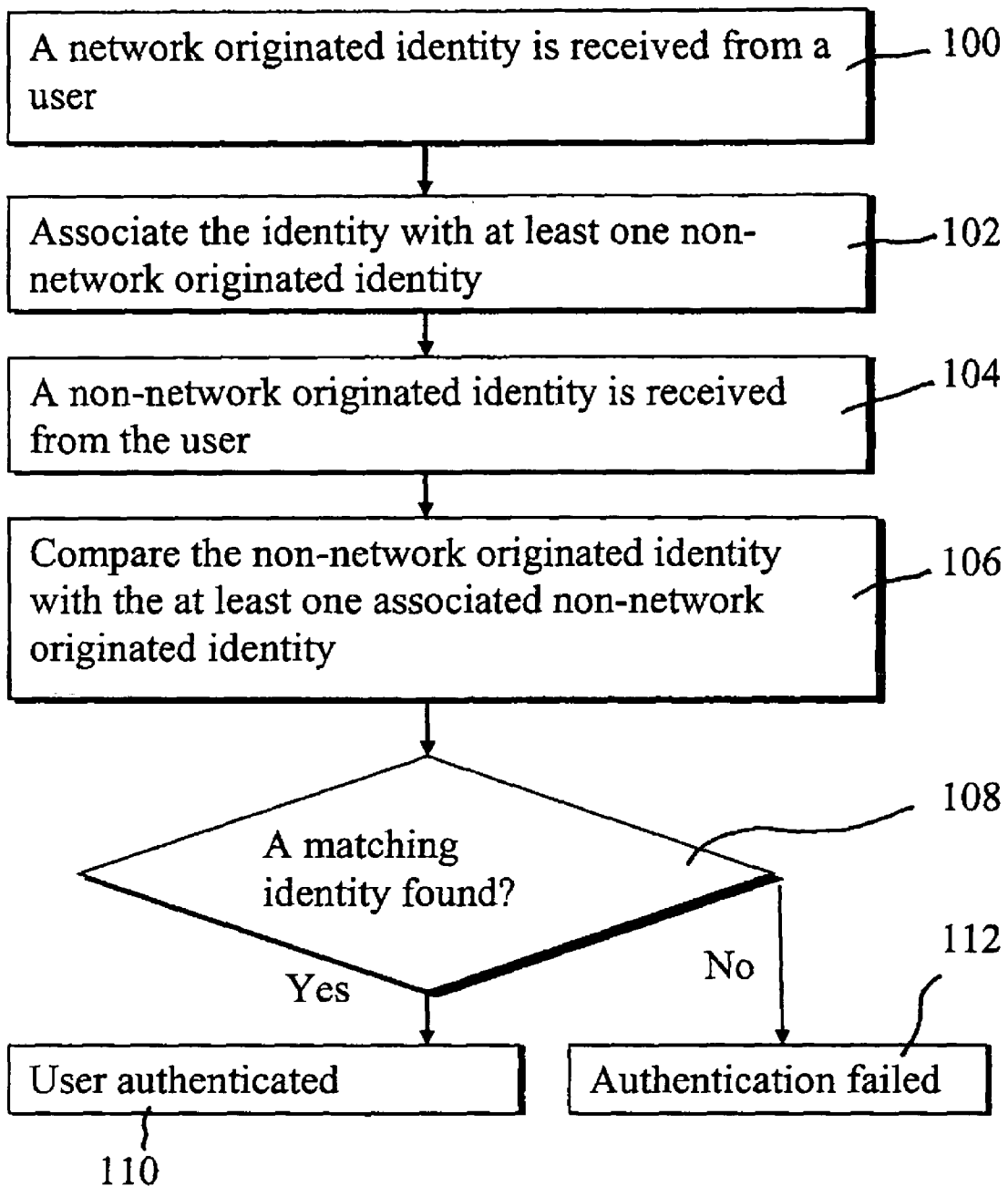
FIG. 3 is a flowchart illustrating an embodiment of the present invention.

The flowchart of FIG. 3 shows the steps in accordance an embodiment. In step 100 a network originated identity is relieved by the network from a user. The received identity is then associated in step 102 with at least one non-network originated identity, this at least one identity being preferably stored in a data storage connected to the network. In step 104 a second identity is received from the user, the second identity comprising a non-network originated identity. In step 106 the non-network originated identity is compared with the at least one non-network originated identity that was identified based on the association. If a matching identity is found in 108, the user is authenticated 110, otherwise the authentication fails 112.

The following describes by way of some examples how the capabilities of the GAA can be expanded to applications that use identities that do not originate from the operator of network 10. It is noted that these non-network originated identities are referred to in some of the following examples as public application specific identities or non-cellular user identities (NCID).

A user may have one or more public application specific identities that originate from, for example, a provider of a service application. In accordance with the embodiments, the application specific identities may be associated with the identities issued by the network operators based on data stored in an application provider entity, for example an application specific server. The following describes two alternative authentication mechanisms wherein this association may be employed.

Figure 4:
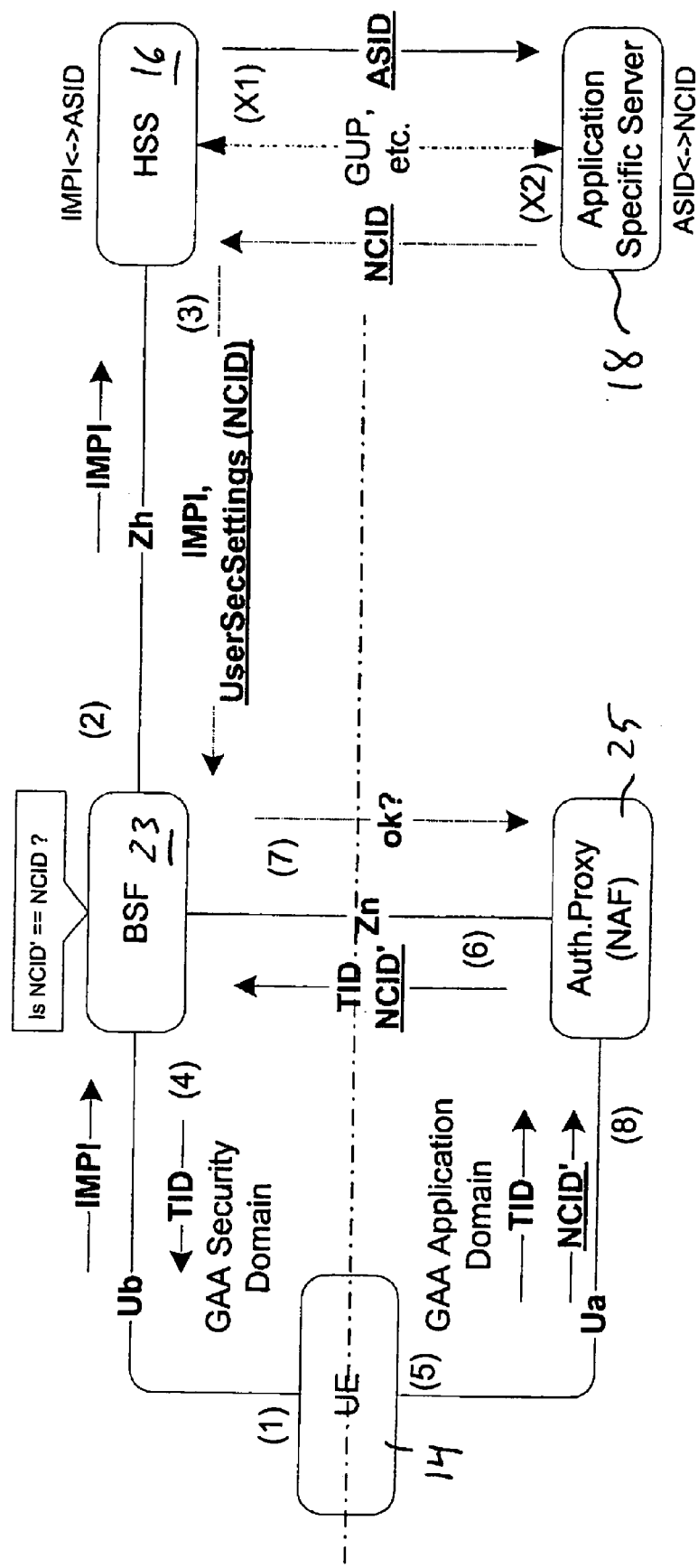
FIGS. 4 to 9 and 12 show exemplifying architectures for use in the embodiments of the present invention.

In accordance with the first exemplifying embodiment a GAA security domain 22 of the mechanism 20 verifies application specific identities. For example, and as shown in FIG. 4, an application specific identity from a user equipment 14 may be transferred to a bootstrapping function (BSF) 23 in GAA via a Network Application Function (NAF) 18 for checking with corresponding application specific identity from the HSS side. In this example the association between the non-cellular and cellular domains is based on associations between the IMPI and NCID.

To generate an association, an application specific identity may be communicated from the mobile user equipment 14 to the BSF 23 or another element in domain 22. The HSS 16 or other appropriate storage connected to domain 22 may then store data associating the IMPI of the user to at least one application specific identity.

It is noted that the implementation of the mechanism may vary, for example, in regards the place of storage of the data regarding the association between IMPI and application specific identity. If the association data is stored in an appropriate application server, it is possible to store a direct binding with an IMPI stored outside home network. An option is to use an Application Specific Intermediate Identity (ASID) or any other appropriate intermediate public identity. In the latter scenario the HSS may store the data of association between an IMPI and Application Specific intermediate Identity (ASID) or similar and the application server may then store data of association between the ASID and application specific identity.

The association between IMPI and application specific identity is stored such that it is accessible for the GAA security domain 22. For example, each of the non-cellular user identities of the user may be stored in application specific user security settings (USS) of the user. The identities in the security settings may then be found based on the IMPI in a network entity such as an application server that the HSS of the user in enabled to access. For example, the user security settings (USS) may be stored in the HSS. The setting may contain information such as control flags and lists of user identifiers for application services.

The matching of an application specific identity from the user equipment and at least one application specific identity from the network side may be performed in various locations, for example in the bootstrapping function 23, home subscriber server 16 or the application server 18. In FIGS. 4 and 7 the verification of the non cellular identity is performed in a BSF, in FIGS. 5 and 6 in a HSS and in FIGS. 8 and 9 in an application server. The following summaries the basic principles of these variants.

In FIG. 4 an IMPI of the user equipment 14 is sent via the BSF 23 to the HSS 16 of the user, see messages (1) and (2). The HSS 16 retrieves a stored application specific intermediate identity (ASID) that corresponds the IMPI of the user from its own databases. Such an intermediate identifier may be used, for example, if the operator does not want or is not allowed to give the real IMPIs to parties running application servers. An ASID may contain address information of the application server. This may be beneficial in certain applications since if an IMPI is used, the address information may need to be stored separately.

A procedure for fetching at least one associated application specific identity from an application server follows. More particularly, the HSS 16 sends the ASID to the application server 18 in message (X1) where after the application server determines if it has at least one associated non-cellular identity in its database. If an application specific identity is found, it is returned in message (X2) to the HSS 16 in response. An appropriate general or application specific interface may be used for communication between the HSS and the server. The HSS 16 may then send the fetched application specific identity the particular IMPI to the BSF 23, see message (3). This information may be transported, for example, in an existing UserSecSettings Attribute value Pair in Diameter (AVP).

The verification of the authenticity of an application specific identity from the user equipment may then be performed by the BSF 23. The BSF may then send an application specific identifier, for example an appropriate temporary identifier (TID) to the user equipment in message (4). The user equipment may then send the application specific identity to a Network Application Function (NAF) in message (5). Upon receipt of a service request the NAF may forward the application specific identity to the BSF for authentication thereof, see message (6). The Network Application Function (NAF) may then verify that that the application specific identity received from the user equipment via the NAF and the application specific identity received from the HSS match. If the application specific identity matches with the application specific identity from the HSS, an OK message (7) is returned to the NAF, and the user equipment is allowed to proceed with the requested service, see communication (8).

The information regarding the association between the non-network originated and the network originated identity that is received from the user equipment may also be stored in an application server. Exemplifying embodiments wherein this possibility of storing the association in the application server is used are shown in FIGS. 5 to 9. This means that the HSS 16 may fetch the application specific identity or other non-network originated identity by sending the IMPI, instead of an ASID, to the application server 12 to fetch the associated non-network originated identity.

Figure 5:
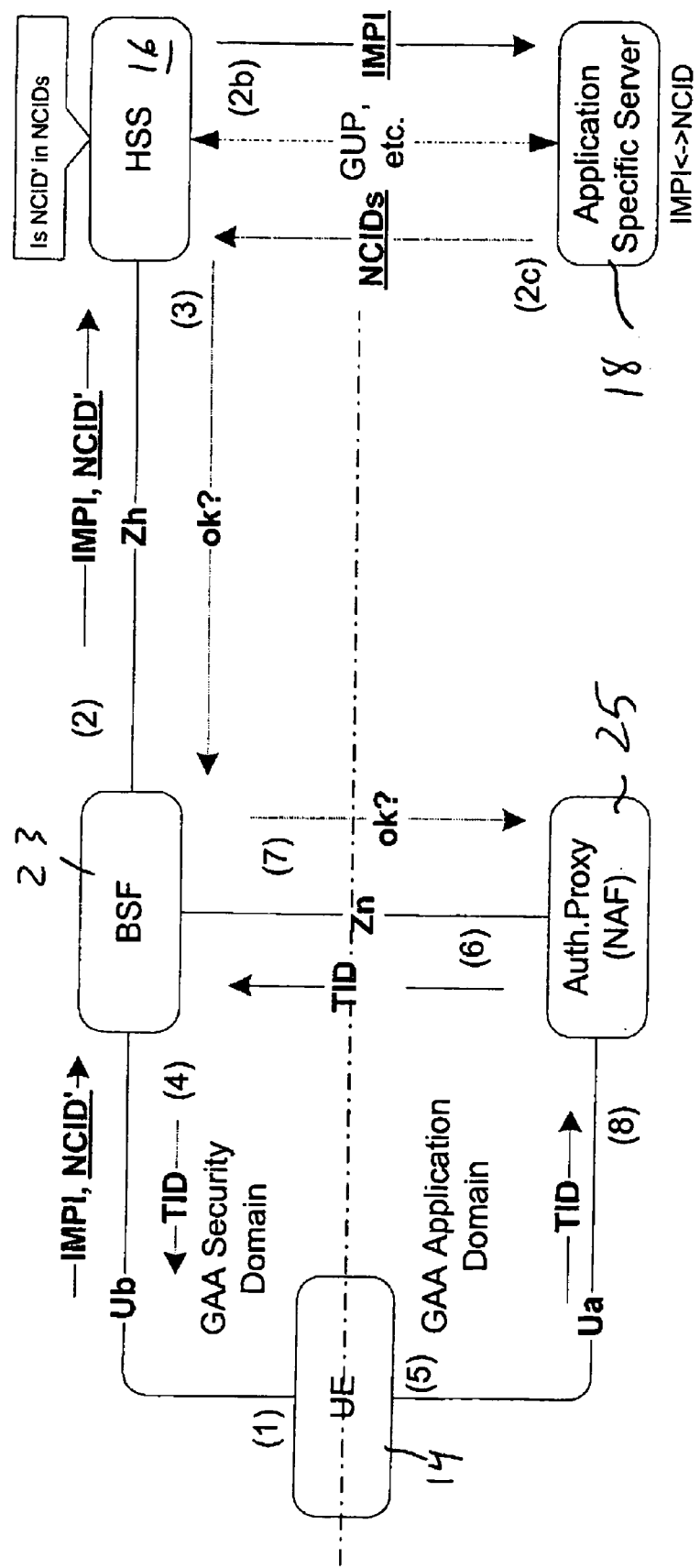
Figure 6:
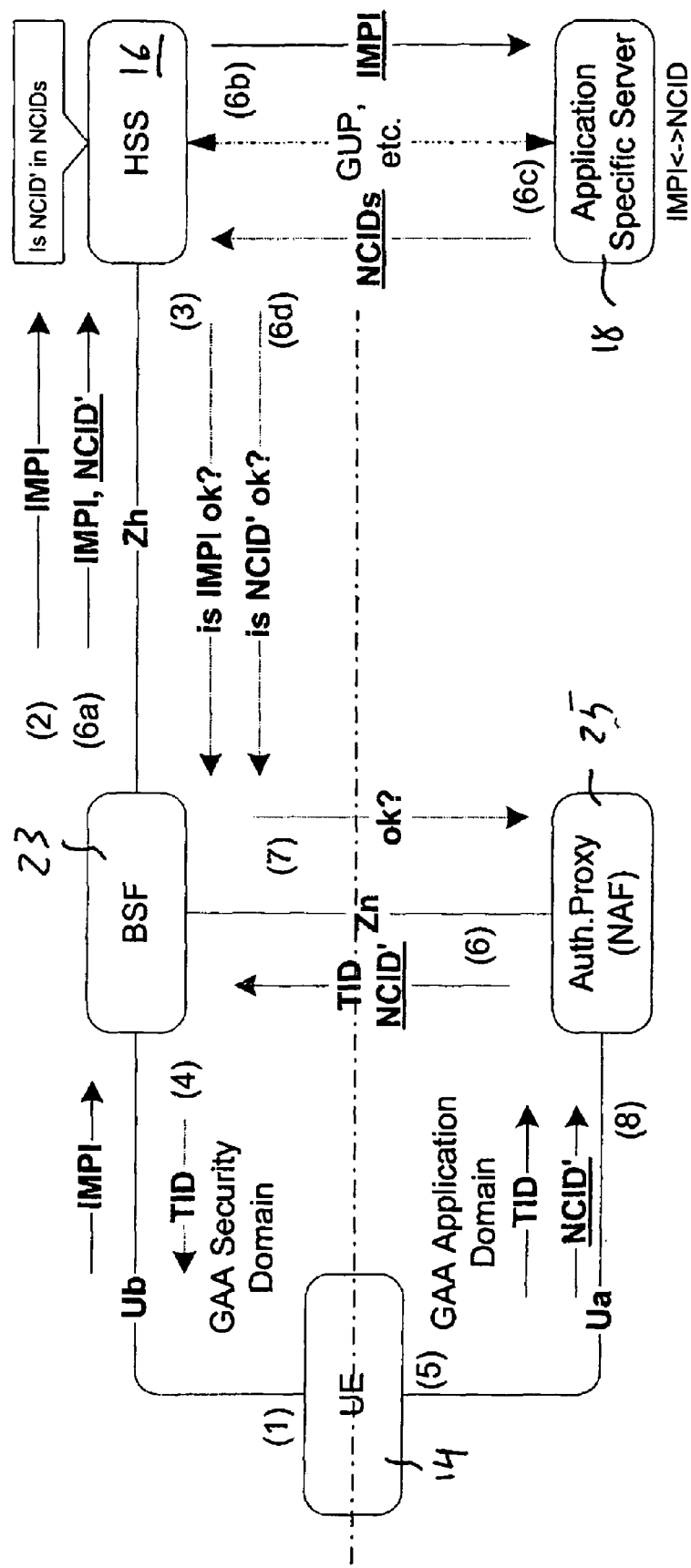
Figure 7:
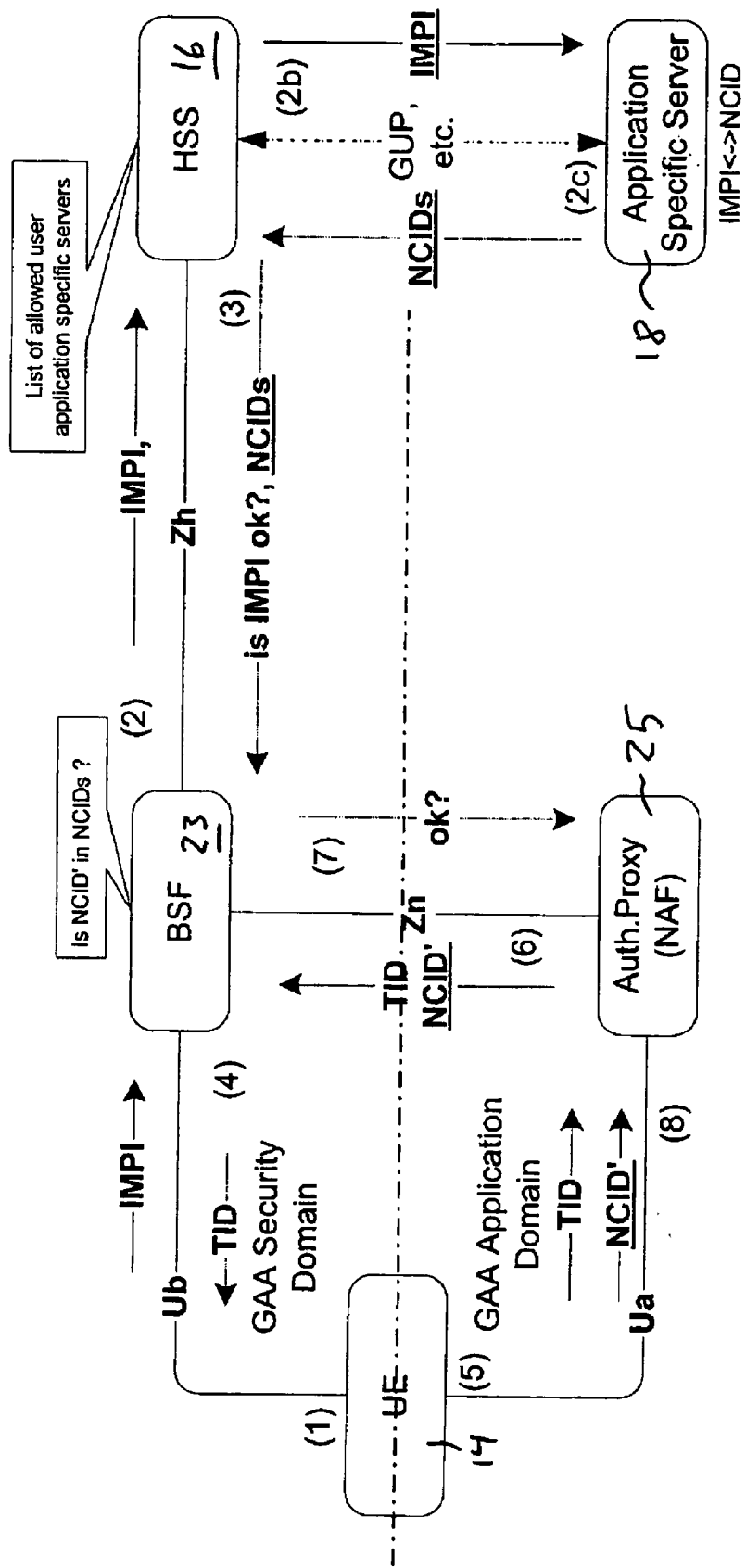
Figure 9:
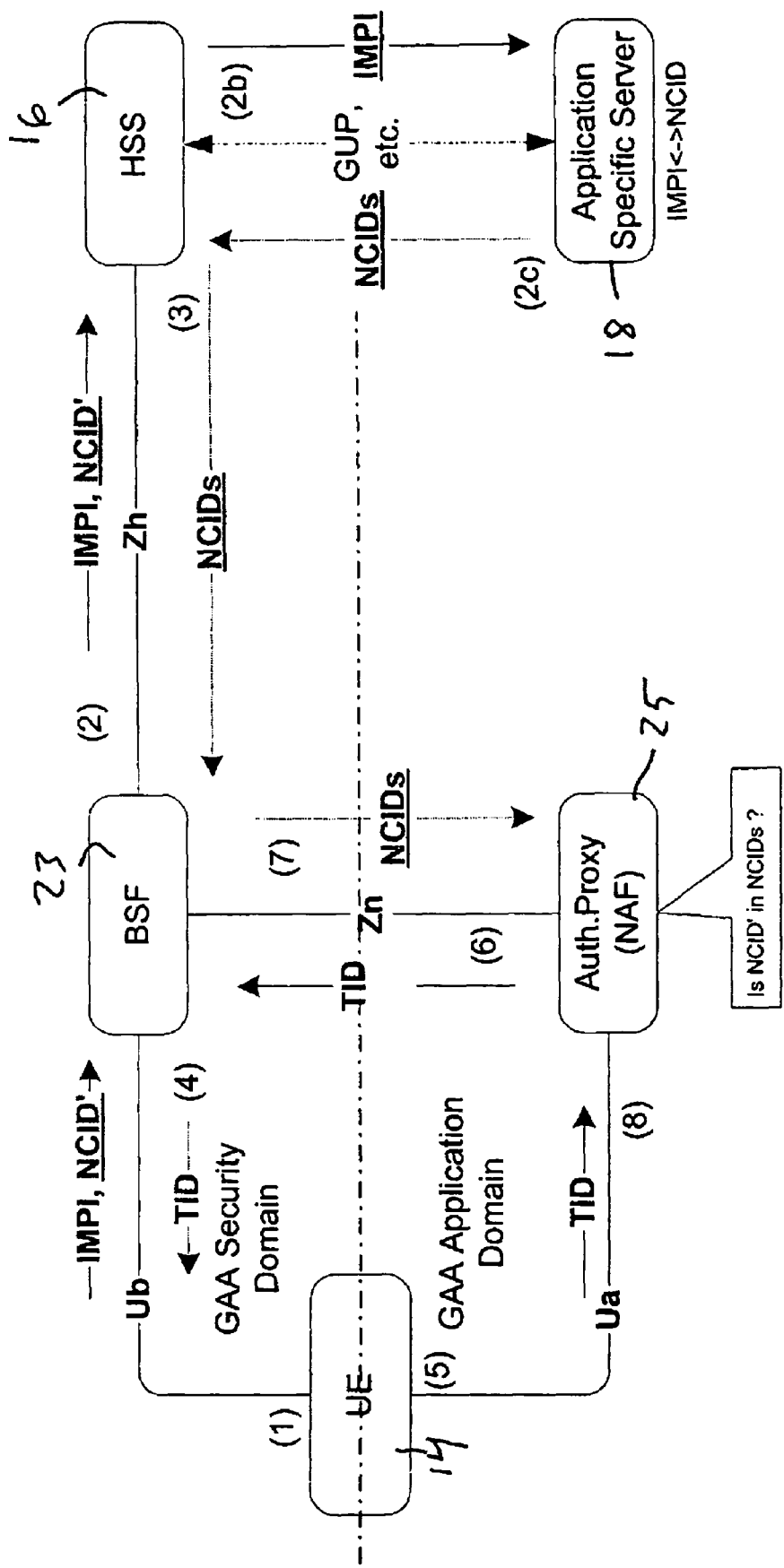

FIGS. 5 and 6 show embodiments wherein the verification if a non-network originated identity from the user equipment matches the non-network originated identity from the application server is performed by the HSS 16. In FIG. 5 a non-network originated identity from the user equipment may be used as an additional information in bootstrapping. An advantage of sending the non-network originated identity already in the bootstrapping, see FIGS. 5 and 9, is that the otherwise necessary double signaling on the interface between the bootstrapping function and the home subscriber server may be avoided (once during in bootstrapping and then again in the actual application procedure). The embodiment of FIG. 5 may require that the user equipment has already decided for which application it will use bootstrapping.

In the embodiment retrieval of associations from possibly unknown application servers can be executed. This enables usage of arbitrary non-network originated identities and applications servers. To enable this the non-network originated identity may contain information about the appropriate application server, for example a domain name. The HSS may know the list of allowed user application specific servers. A possibility is to include the required in the ASID so that itself may identify the required server.

In FIG. 5, the NAF is authenticated based on a non-network originated identity. In FIG. 6, the BSF forwards a non-network originated identity from the user equipment to the HSS for matching. If a match is found, an OK message can be returned via the BSF to the NAF.

In the embodiments an application specific identifier such as a temporary identity (TID) can be transported to the bootstrapping function (BSF). The bootstrapping procedure may create a TID as required by the BSF and user equipment. The correct TID from a NAF may be used as a verification to the BSF that the user equipment is authorized by the NAF to use the results of the previous bootstrapping procedure. The TID can thus be seen as an identifier of an executed bootstrapping procedure and also at the same time have the function of secret key. The TID may be the only authentication of NAF towards the BSF.

In FIG. 7 the verification is performed by the BSF in the security domain.

Figure 8:
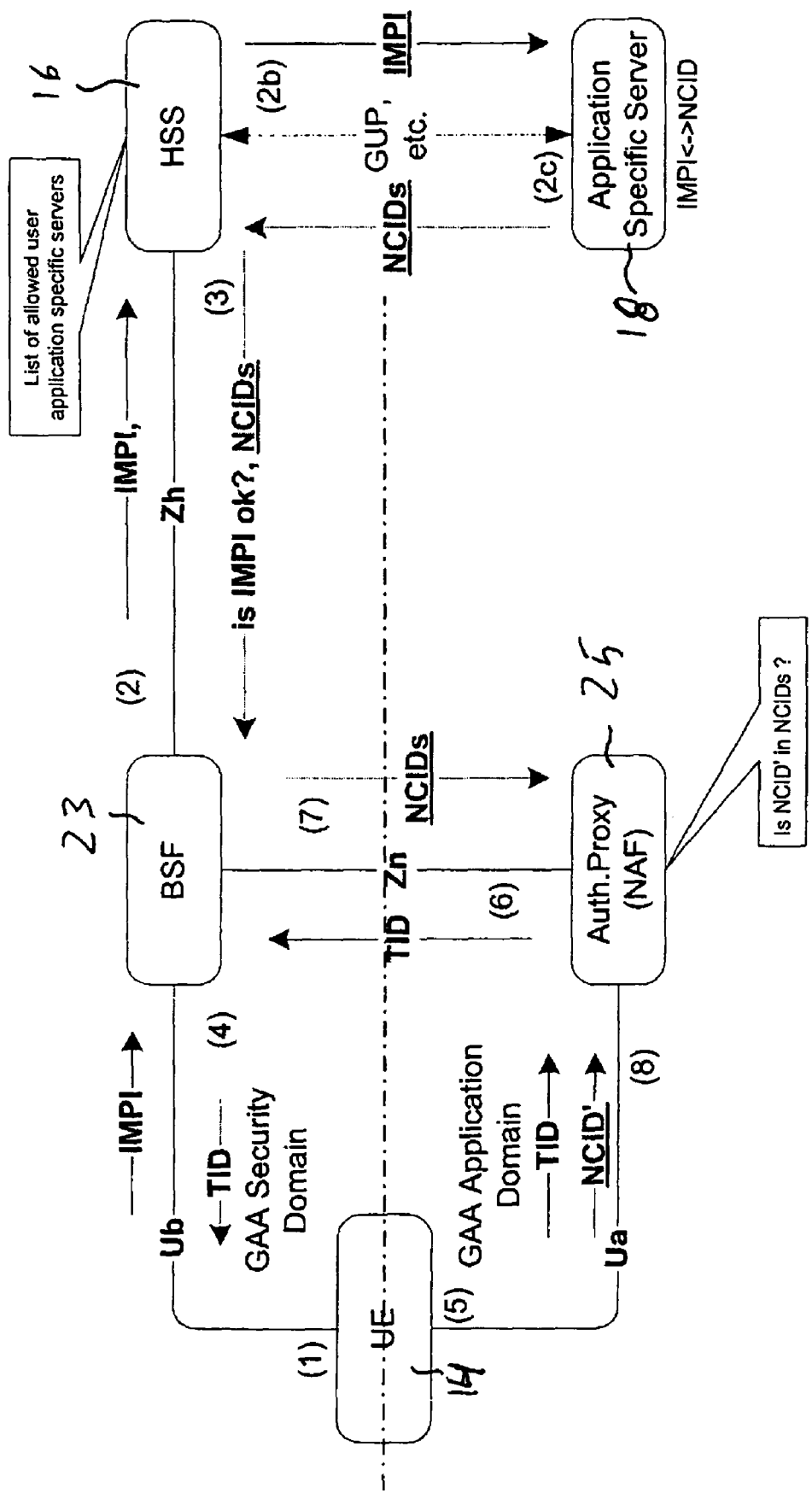

FIGS. 7 and 8 show the possibility of retrieving all possible non-network originated identities into the bootstrapping function. This is compatible with the current 3GPP specifications (revision 6), where it is defined that the NAF shall check the association. In addition to the specifications, external application servers are used and non-network originated identities are used instead of IMPUs in a GAA user security settings data element.

According to a possibility shown in FIGS. 8 and 9 the verification of the non-network originated identity from the user equipment may be performed in the application domain, for example by an authentication application server or proxy.

Figure 10:
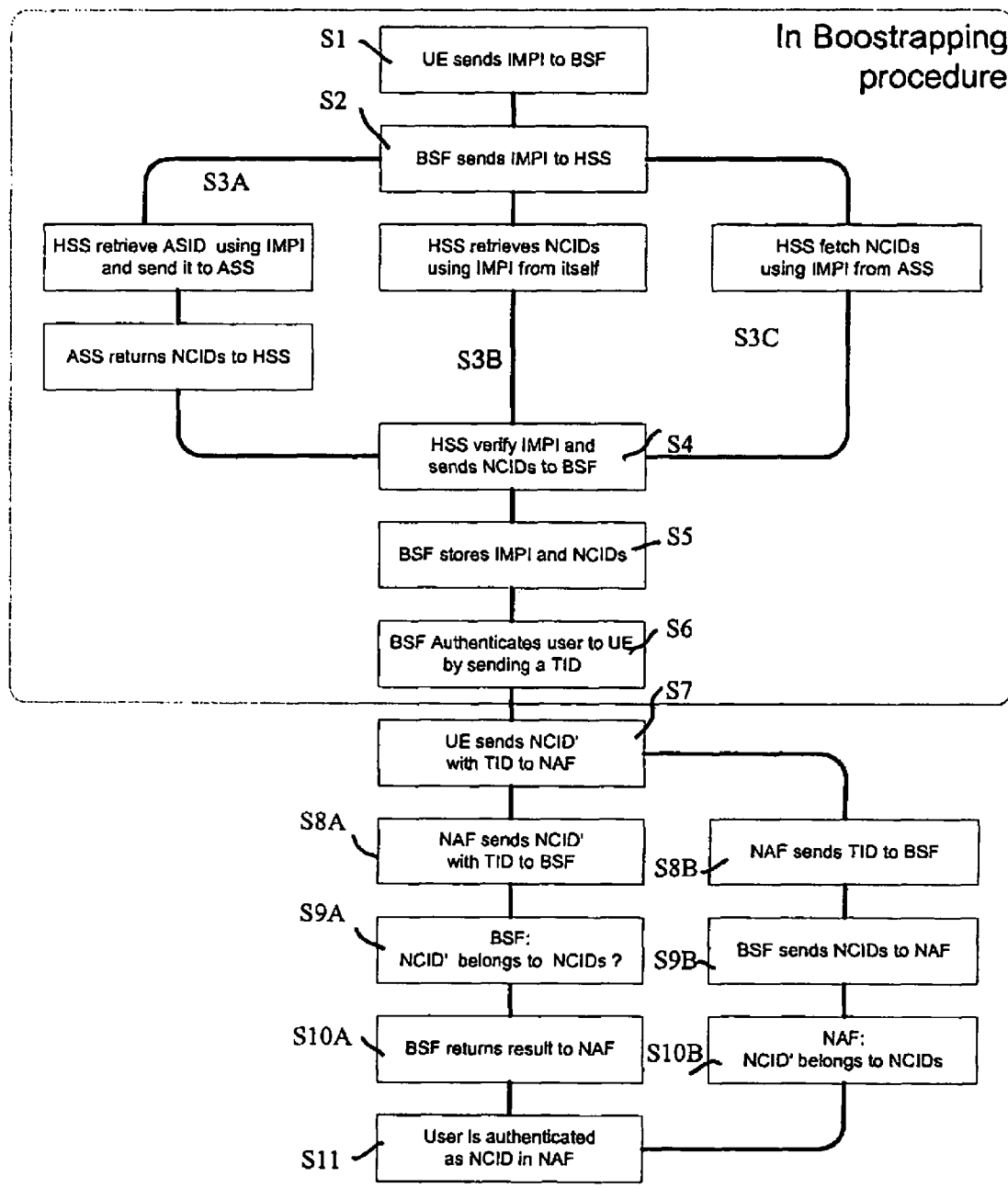
FIGS. 10, 11 and 13 are examples of various algorithms that are possible for implementing the various embodiments.

FIG. 10 is a chart illustrating possible steps that may be taken in a particular embodiment that is applicable to architectures wherein the verification is accomplished by a bootstrapping function. At step S1 a user equipment sends a mobile user identity IMPI to the bootstrapping function. The bootstrapping function then sends the IMPI to a home subscriber server, in accordance with step S2. At the next step the home subscriber server uses the IMPI to obtain NCID from an appropriate data storage. FIG. 10 illustrates three possibilities S3A, S3B and S3C for this operation. In step S4 the NCID is communicated to the bootstrapping function. The BSF then performs the required bootstrapping functions to verify if an application specific identifier can be assigned for the user equipment. It also stores the received IMPIS and NCID in step S5. In step S6 the BSF may then send an application specific authentication to the user equipment.

According to step S7, the user equipment on the application side sends its non-cellular identity (NCID') together with the application specific identifier to a network application function. The network application function may then send these to the bootstrapping function as denoted at step S8A. Alternatively only the TID is sent to the BSF, see step S8B. The bootstrapping function may then execute required software to compare the NCID retrieved from the home subscriber server binding with the identity NCID' at step S9A. The bootstrapping function returns a response to the network application function as denoted by step S10A and, assuming that the response is "ok", the network application function authenticates to the user equipment as denoted at step S11.

Alternatively, the bootstrapping function returns in response to a TID which it has received from the user equipment via the NAF a NCID, see step S9B. The NAF may then perform the verification at step S10B. If the verification is positive, step S11 follows.

Figure 11:
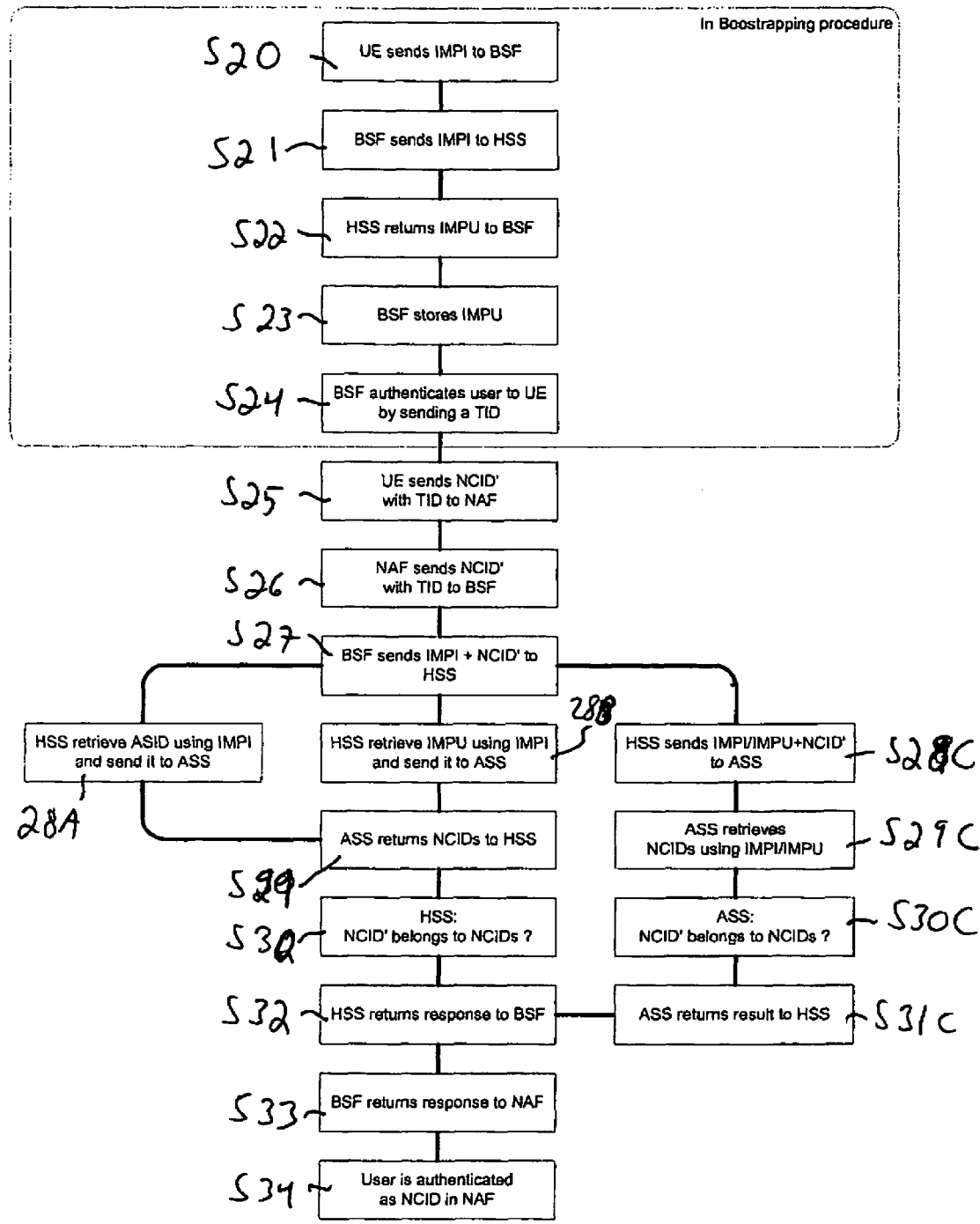

FIG. 11 illustrates embodiment wherein the comparison software is executed by a home subscriber server. At step S20 the process begins by the user equipment sending the mobile identity IMPI to a bootstrapping function. Steps S21 to S24 are a part of a bootstrapping procedure wherein the bootstrapping function sends the IMPI to a home subscriber server, in accordance with step S21, and then the home subscriber server returns in step S22 a IMPU obtained from an appropriate data storage. The BSF then performs the required bootstrapping functions to verify if an application specific identifier can be assigned for the user equipment. It may also store the received IMPU in step S23. In step S24 the BSF may send an application specific authentication information to the user equipment.

In step S25, the user equipment sends its non-cellular identity NCID' with the TID to the network application function. The network application function may then send the identity information to the bootstrapping function as denoted by step S26. At step S27, the bootstrapping function sends the mobile identity IMPI and the non-cellular identity NCID' from the network application function to the home subscriber server.

The home subscriber server may process the information in various ways to obtain a NCID. The home subscriber server may retrieve an application specific identity (ASID) based on the IMPI from its database and send it to the application server, see step S28A. In an alternative embodiment, see step S28B, the HSS retrieves an IMPU and send it to the application server. In both of these alternatives, the application server returns a NCID to the HSS in step S29. The HSS may then verify if the NCID' is one of the NCIDs, and return appropriate response to the bootstrapping function, steps S30 and S32.

In an alternative the HSS responds the information form the bootstrapping function by sending it to an application server, see step S28C. The application server may then retrieve the non-cellular identity or identities and perform the required verification, see steps S29C and S30C. It then returns the results to the home subscriber server at step S31C, and the home subscriber server returns a response to the bootstrapping function at step S32.

The process then proceeds from step S32 by the bootstrapping function returning a response to the network application function, step S33. At step S34 the network application function authenticates the user equipment.

Figure 12:
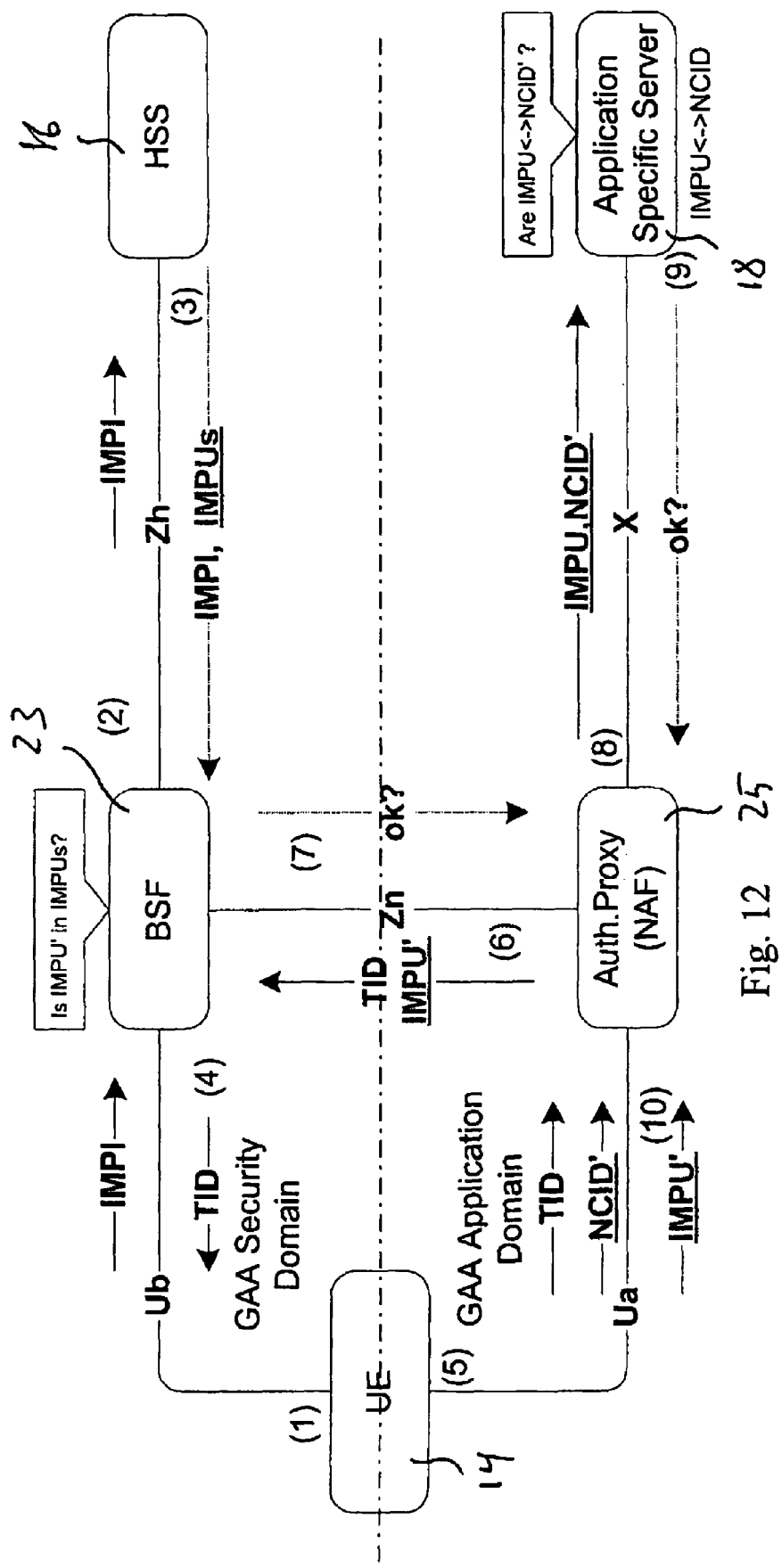

According to the scenario shown in FIG. 12, the GAA security domain verifies the IMPU and GM application domain verifies non-network originated identity with IMPU. In this case data regarding non-network originated identities is stored in an application specific server 18 so that associated non-network originated identities can be fetched using an IMPU. The GM may verify the IMPU that the user equipment gives to the NAF, and the NAF may be provided with the capability to transfer the IMPU and in some implementation variants also the non-network originated identity from the user equipment to the application specific server 18 for checking if this matches with a corresponding non-network originated identity form the application specific server side.

In this scenario the mobile identity (e.g. IMPU) is used as an intermediately verified user identity. The GM security domain verifies the given IMPU for NAF. Each application stores information regarding the binding of the IMPU and non-network originated identity to its own servers (ASS). The coherence checking between non-network originated identity and IMPU is executed either in the NAF or in the application server. It is also possible that an applications specific NAF performs also the above functions of the application server without any external interfaces. In this embodiment a non-network originated user identity is transferred with an IMPU from a UE to the NAF.

The NAF may check the matching of the non-network originated identities from the UE and the non-network originated identity found based on the association. The NAF may get the non-network originated identity as an answer to sending of the IMPU to the application server. The application server may alternatively check the matching of the non-network originated identity from the user equipment and the non-network originated identity found based on an association.

An embodiment wherein the comparison software is executed at the network applications function will now be described with reference to the flowchart of FIG. 13. According to this alternative, an intermediate identity IMPU is used as an intermediate verified user identity. This is held in association with mobile identities IMPIs at the home subscriber server in a database. The GAA security domain verifies the given IMPU for the network application function in accordance with conventional GAA procedure which is not described herein. The application specific server holds the bindings between IMPU and non-cellular identities NCID in a database or store.

At step S40 the user equipment sends the mobile identity IMPI to the bootstrapping function. The bootstrapping function sends the mobile identity IMPI to the home subscriber server according to step S41, and a procedure in accordance with steps S22 to S24 of FIG. 11 may follow.

At step S45, the user equipment dispatches its own IMPU which is denoted herein as IMPU', its non-cellular identity NCID' and the TID to the network application function. The network application function dispatches the IMPU' with the TID to the bootstrapping function according to step S46. The bootstrapping function may then authenticate the IMPU', and send results to the NAF, step S47.

Figure 13:
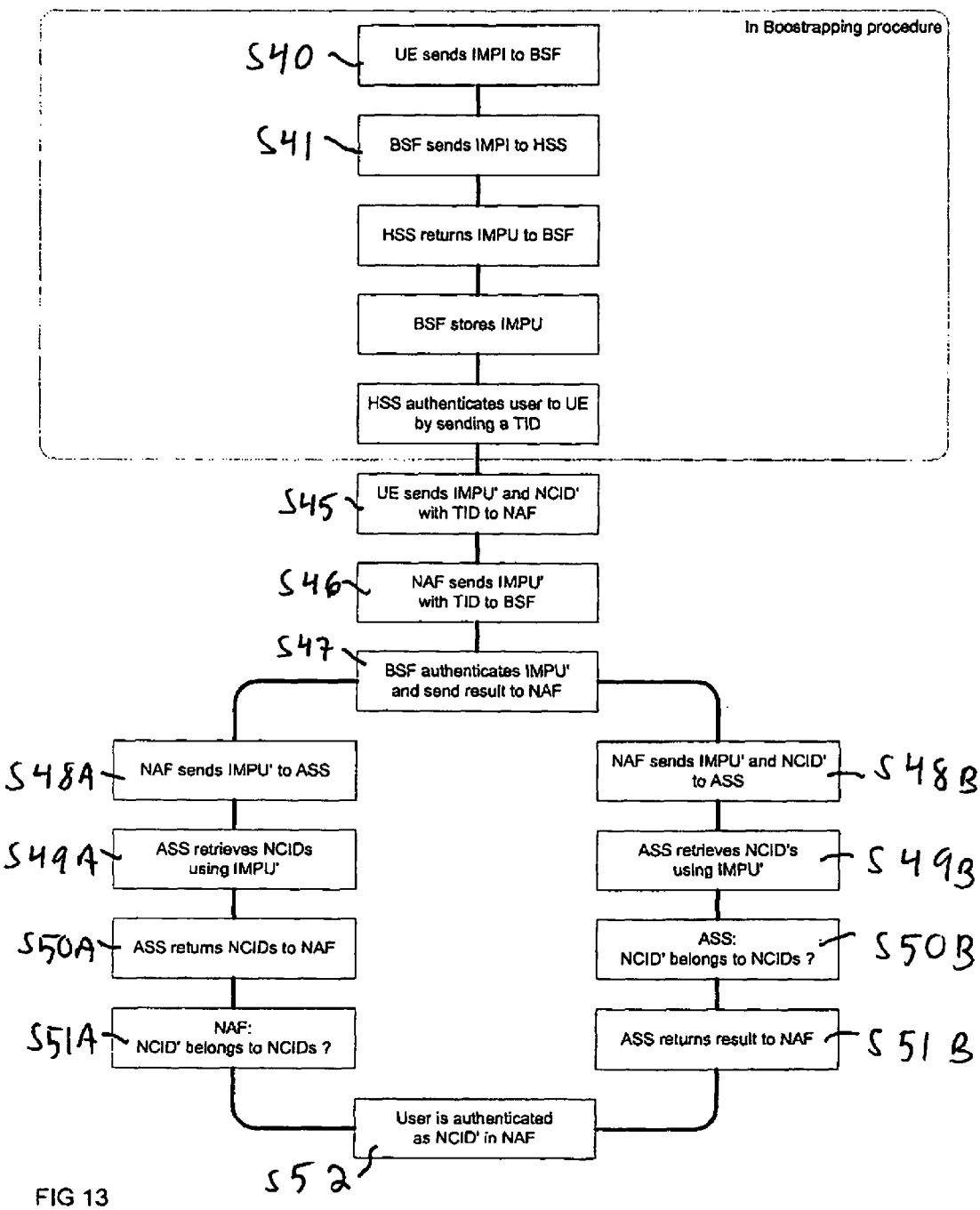

The NAF may then proceed in various manners, two possibilities being shown in FIG. 13. The NAF may send the IMPU' to the application server at step S48A where after the application server may retrieve NCID at step S49A. The application sever may then return the NCID to the network application function according to step S50A. The network application function then checks that the identities match, and perform the authentication, steps S51A and S52.

Alternatively, the NAF may send the IMPU' and the NCID' to an application server, step S48B. The application server retrieves the NCID or NCIDs based on the IMPU', S49B. The application specific server check if the NCID' is one of the NCIDs and returns results to the network application function, see step S50B and S51B. The network application function may then execute a comparison software to compare the non-cellular identity which it has received from the application specific server with the non-cellular identity which it received from the user equipment at step S52. Assuming that the comparison is correct, the network application function authenticates to the user equipment.

In an alternative embodiment the comparison software 28 located in the application specific server may compare a binding between the IMPU which has been authenticated by the bootstrapping function and the non-cellular identity NCID' with the bindings IMPU/NCID which are held at the application specific server in a database.

Some changes may be required to the current GAA specifications, the possible changes being discussed in the following. It is noted that some of the changes below are alternatives to each other, and not all of them are required for the operation in accordance with the principles of the invention. The interfaces between the mobile user equipment and the network need to be capable of transferring non-cellular user Identities (NCID) for which the authentication is required. An interface between the BSF and the NAF may need to be provided in certain embodiments with additional capability to transfer also the non-cellular user Identity (NCID) from the NAF to BSF. The non-network originated identity may need to be stored permanently to application's User Security Settings (UserSecSettings) in GAA-UserSecSettings in an appropriate register. There are own application's User Security Settings defined for each application that uses some non-network originated identity. All GAA user security settings may need to be downloaded to BSF. If data of associations between the non-network originated identity and the IMPI is stored in an application specific server (ASS) outside the GAA, the HSS should have access to that ASS. The non-network originated identity may be downloaded using GAA user security settings in answer message to BSF. For optimization reasons there may be needs for addition indication of GAA application type to the request message from BSF to HSS if the BSF knows it. Otherwise the HSS may need to generate non-network originated identities to user security settings for all possible GAA applications. BSF may be provided with an additional functionality to coherence checking that the non-network originated identities from NAF and non-network originated identities from HSS in an application user security setting are identical. This change holds for variations where BSF is used for the comparison.

The above data processing functions may be provided by means of one or more data processor entities. Appropriately adapted computer program code product may be used for implementing the embodiments, when loaded to a computer, for example for performing the computations and the searching, matching and combining operations. The program code product for providing the operation may be stored on and provided by means of a carrier medium such as a carrier disc, card or tape. A possibility is to download the program code product via a data network. Implementation may be provided with appropriate software in a location server. Thus it may be that no additional hardware is needed in some applications. Additional memory and processing capacity may be needed in a location server.

It should be appreciated that whilst embodiments of the present invention have been described in relation to user equipment such as mobile stations, embodiments of the present invention are applicable to any other suitable type of user equipment.

It is noted that even though the exemplifying communication system shown and described in more detail in this disclosure uses the terminology of the $3^{rd}$ generation (3G) WCDMA (Wideband Code Division Multiple Access) networks, such as UMTS (Universal Mobile Telecommunications System) or CDMA2000 public land mobile networks (PLMN), embodiments of the proposed solution can be used in any communication system wherein advantage may be obtained by means of the embodiments of the invention. The invention is not limited to environments such as cellular mobile or WLAN systems either. What is important is that a provider of communication services does not necessarily need to store all possible user application identifiers to its own registers. Thus terms such as the non-network originated identity shall be understood to refer broadly to an identity that is provided and managed by somebody else, for example to all kinds of application specific identities that are not necessarily stored in the data bases of the operator that provides the subscriber databases and user identity modules on terminal side.

It is also noted herein that while the above describes exemplifying embodiments of the invention, there are several variations and modifications which may be made to the disclosed solution without departing from the scope of the present invention as defined in the appended claims.

The invention claimed is:

1. A method comprising:
receiving a network originated identity from a user in a communication network;
associating the network originated identity with at least one non-network originated identity stored in a data storage, wherein the at least one non-network originated identity comprises a first identity of an application outside a domain of an operator of the communication network, and wherein the network originated identity comprises at least a second identity originated by the operator, an internet protocol multimedia private identity, and an international mobile subscriber identity;
receiving a non-network originated identity from the user;
storing data for associating an intermediate identity with the non-network originated identity and the associated network originated identity;
accessing the intermediate identity for verification of the non-network originated identity;
comparing the non-network originated identity from the user with the at least one non-network originated identity from the data storage; and
authenticating the user if the comparison is valid.

2. A method according to claim 1, wherein the associating comprises associating the network originated user identity with at least one non-network originated identity in an application server, and wherein the comparing is implemented at least at one of a bootstrapping function, a home subscriber server, and an application specific server.

3. A method according to claim 1, wherein the authenticating comprises authenticating the user in the data storage.

4. A method according to claim 1, wherein the authenticating comprises authenticating the user in a bootstrapping function.

5. A method according to claim 1, wherein the authenticating comprises authenticating the user in an application server.

6. A method according to claim 1, wherein the associating comprises dispatching the network originated identity to a central data storage which stores associations between mobile identities and application specific identities.

7. A method according to claim 1, wherein the associating comprises retrieving an application specific identity based on a mobile identity and using the application specific identity to access the at least one non-network originated identity.

8. A method according to claim 1, wherein the comparing comprises comparing the non-network originated identity with the at least one non-network originated identity in an element providing a home subscriber database of the user.

9. A method according to claim 1, wherein the comparing comprises comparing the non-network originated identity from the user with at least one non-network originated identity in an application server.

10. A method according to claim 1, wherein the data for association between the intermediate identity and the non-network originated identity is held at an application server.

11. A method according to claim 1, wherein the comparing comprises comparing the at least one non-network originated identity having an association with the intermediate identity and the non-network originated identity received from the user at a network application function of a general authentication architecture.

12. A method according to claim 1, wherein the comparing comprises comparing the at least one non-network originated identity having an association with the intermediate identity and the non-network originated identity received from the user at an application specific server.

13. A method according to claim 1, further comprising:
creating a temporary identifier in a bootstrapping function;
sending the temporary identifier to a user equipment; and
sending the temporary identifier from the user equipment to an application function when requesting for a service.

14. A method according to claim 1, comprising authentication by a generic authentication architecture in accordance with specifications of the third generation partnership project.

15. A computer program, embodied on a non-transitory computer readable medium, said computer program controlling a computing system to perform operations comprising:
receiving a network originated identity from a user in a communication network;
associating the network originated identity with at least one non-network originated identity stored in a data storage, wherein the at least one non-network originated identity comprises a first identity of an application outside a domain of an operator of the communication network, and wherein the network originated identity comprises at least a second identity originated by the operator, an interne protocol multimedia private identity, and an international mobile subscriber identity;
receiving a non-network originated identity from the user;
storing data for associating an intermediate identity with the non-network originated identity and the associated network originated identity;
accessing the intermediate identity for verification of the non-network originated identity;
comparing the non-network originated identity from the user with the at least one non-network originated identity from the data storage; and
authenticating the user if the comparison is valid.

16. An apparatus comprising:
a receiver configured to receive a network originated identity from a user in a communication network;
an associating unit configured to associate the network originated identity with at least one non-network originated identity, wherein the at least one non-network originated identity comprises a first identity of an application outside a domain of an operator of the communication network, and wherein the network originated identity comprises at least a second identity originated by the operator, an internet protocol multimedia private identity, and an international mobile subscriber identity;
a receiver configured to receive a non-network originated identity from the user;
storage including data for associating an intermediate identity with the non-network originated identity and the associated network originated identity, the intermediate identity accessed for verification of the non-network originated identity;
a comparator configured to compare the non-network originated identity from the user with the at least one non-network originated identity from the associating unit; and
an authenticator configured to authenticate the user if the comparison is valid.

17. An apparatus according to claim 16, wherein the receiver configured to receive the network originated identity from the user comprises a bootstrapping function.

18. An apparatus according to claim 16, wherein the receiver configured to receive the non-network originated identity from the user comprises a network application function.

19. An apparatus according to claim 16, wherein said comparator is implemented in a bootstrapping function.

20. An apparatus according to claim 16, wherein said comparator is implemented in a home subscriber server.

21. An apparatus according to claim 16, wherein said comparator is implemented in an application specific server.

22. An apparatus according to claim 16, comprising a generic authentication architecture in accordance with the Third Generation Partnership Project (3GPP) standard.

* * * * *